United States Patent [19]

Ulch et al.

[11] 4,155,073

[45] May 15, 1979

[54] SYSTEM FOR MONITORING INTEGRITY OF COMMUNICATION LINES IN SECURITY SYSTEMS HAVING REMOTE TERMINALS

[75] Inventors: Bryan D. Ulch, Valencia; Sarkis V. Kalustian, North Hollywood, both of Calif.

[73] Assignee: A-T-O Inc., Willoughby, Ohio

[21] Appl. No.: 827,994

[22] Filed: Aug. 26, 1977

[51] Int. Cl.² .................. H04Q 9/00; G08B 23/00
[52] U.S. Cl. ............................ 340/147 R; 340/505
[58] Field of Search ................ 340/147 R, 286, 408, 340/409, 146.1 E, 146.1 A; 179/15 AL

[56] References Cited

U.S. PATENT DOCUMENTS

| | | | |
|---|---|---|---|
| 3,593,290 | 7/1971 | Kerr | 340/147 R |
| 3,593,293 | 7/1971 | Rorholt | 178/4.1 R |
| 3,864,578 | 2/1975 | Lackey | 340/168 B |
| 4,002,843 | 1/1977 | Rackman | 179/15 AL |
| 4,044,351 | 8/1977 | Everson | 340/408 |

OTHER PUBLICATIONS

IBM Technical Disclosure Bulletin, vol. 19, No. 4, 9-1976, "Secure Alarm Sensing Method" W. A. Boothroyd.

*Primary Examiner*—Donald J. Yusko
*Attorney, Agent, or Firm*—Knobbe, Martens, Olson, Hubbard & Bear

[57] ABSTRACT

A line monitoring system is disclosed which provides particular advantages to security systems having remote terminals. This system provides both a reduction in the required power for the line monitoring task and also increases the level of line security by generating a calculated response at the remote terminal, which calculated response could not be accidentally produced by a faulty remote unit. Futhermore, the calculated response at the remote unit greatly reduces the likelihood of clandestine entry at the remote site.

17 Claims, 1 Drawing Figure

SYSTEM FOR MONITORING INTEGRITY OF COMMUNICATION LINES IN SECURITY SYSTEMS HAVING REMOTE TERMINALS

BACKGROUND OF THE INVENTION

This invention relates to communication line monitoring systems and, more particularly, systems designed for monitoring communication line integrity between the central control station and plural remote stations in a security network. Such security networks may be used, for example, for limiting access to various industrial or commercial facilities or for monitoring the movement of personnel throughout a facility.

In the prior art, such systems have provided a limited degree of line security, but only through substantial waste of electrical energy. Specifically, systems in the past utilizing plural remote terminals have generally operated on a polling basis. That is, a central computer station polls the remote stations, generally by station address, in a particular order to determine whether each of the stations has data requiring communication to the central computer. Such systems thus transmit polling signals from the central computer over a polling signal line, the signals being sent sequentially to poll all the remote terminals in the system in sequence. If no response is received from a given terminal indicating a need to communicate, the next terminal in order is polled by the central computer.

Obviously, if all of the communication lines to one of the remote terminals has been cut, the polling signal transmitted by the central computer for that terminal will produce no response. Since, however, a lack of transmitted data is the expected response if the terminal does not have data for communication to the central processor, in order to provide some degree of line security in this type of communication system, the prior art has utilized a transmission code in which the non-transmission mode provides a continuous flow of current in the data loop between the central processor and the remote terminal. Thus, data is communicated in this network by open circuiting this continuous current flow for short periods of time in a binary coded fashion. By utilizing this continuous current flow during non-transmission periods, it is possible to detect an open circuit data line. Since the central computer interprets the lack of current produced by open circuited data lines as a data condition, it stops its polling operation, and waits for the remainder of the data transmission which, of course, in the case of open data lines, never occurs. Under these circumstances, prior art systems have provided an indication of open circuit data lines which were monitored by noting a single bit data condition where no further data is received.

Such systems, of course, could not provide security for the lines which would detect a shorted data line condition, since a short data line would be interpreted as a normal condition in which current was flowing during non-transmission periods. Furthermore, in systems in which separate polling and data lines are utilized, such prior art security was unable to detect open circuit or short circuit configurations in the polling lines, since the data line in that situation would provide a current return path which is indistinguishable from the normal response when a polling signal is received but no data needs transmission.

It should be understood that a typical environment for such security systems is one in which a central computer located in an industrial or commercial facility is used to give selective access at various doors throughout a facility. Each of these doors will be provided with a remote terminal into which various personnel can place a pass card. On reading the pass card, the remote terminal transmits the identification of the person wishing to gain access to the central computer in response to polling signals from the computer which are received periodically. Thus, this remote terminal must wait its turn to communicate its data with the main computer. The main computer, in response to the identification of the individual wishing to gain access, will provide data signals which direct the remote terminal to grant or deny access by opening or not opening the particular lock on the door next to the remote terminal. Security is important in such systems to prohibit clandestine access to certain portions of a facility, either by employees who, although they have cards, are not entitled to access to this particular facility portion, or to persons who are not entitled to any facility access whatsoever.

It will be understood that the prior art systems using a continuous current flow as the non-transmission mode provide only minimal line security, but at the same time utilize very substantial amounts of electrical power to maintain the constant current flow in all of the remote lines.

SUMMARY OF THE INVENTION

The present invention provides for substantially increased line security, while at the same time eliminating the needless waste of electrical power during non-transmission periods. This is accomplished, essentially, by providing a capability in the remote terminals for receiving polling signals and calculating a response to be transmitted to the central processor on the data communication lines indicating that the remote terminal is functioning properly, even though the remote terminal has no specific data to communicate. Thus, in the situation where no person has inserted a coded card, and thus no one requires access through a particular door controlled by a remote terminal, that remote terminal will, nevertheless, transmit to the central processor, in response to each and every receipt of its polling signal, a brief data communication calculated to notify the central processor that the remote terminal is functioning properly. It will be understood that this type of system will protect the line security of either the polling lines or data communication lines, since no calculated response will be received at the central processor unless the polling signal is properly received at the remote terminal and the remote terminal can communicate on the data lines its calculated response.

Utilizing a system of this type, the present invention permits a data mode in which the non-transmission mode is open circuited, or a condition where no current flows. It has been found that by inverting the transmission codes so that no current flows during non-transmission periods, a power saving of approximately 90 percent in the entire system can be realized.

Of more importance, of course, is the fact that the line security within the system has been very significantly increased. In particular, it is now impossible, by either short circuiting or open circuiting the polling or data lines, to deactivate a remote terminal and thus gain clandestine entry through a building door without alerting the central processor. The particular code sent by the remote terminal to the central processor may, in fact, be a complex coded word. Such a word would be virtually impossible to superimpose upon the line artificially if a person wished to gain secret entry. Furthermore, the time between receiving successive polling signals in a system of this type at a particular remote terminal can be extremely short. Since anyone wishing to make secret entry to a facility door would have to attach an artificial coding system to the data lines between receipt of successive polling signals (so as not to interrupt the normal polling signal flow), the short duration between polling signals would make such an operation virtually impossible.

It can thus be seen that the present security system greatly enhances the security of the overall system, since the maintenance of line integrity is, in most cases, the weakest security link within the system.

These and other advantages of the present invention are best understood through a reference to the detailed description of the preferred embodiment, which references the drawing, in which:

FIG. 1 is a block diagram representation of the line security portions of the central and remote terminals embodying the present invention.

DETAILED DESCRIPTION OF THE PREFERRED EMBODIMENT

Figure 1:
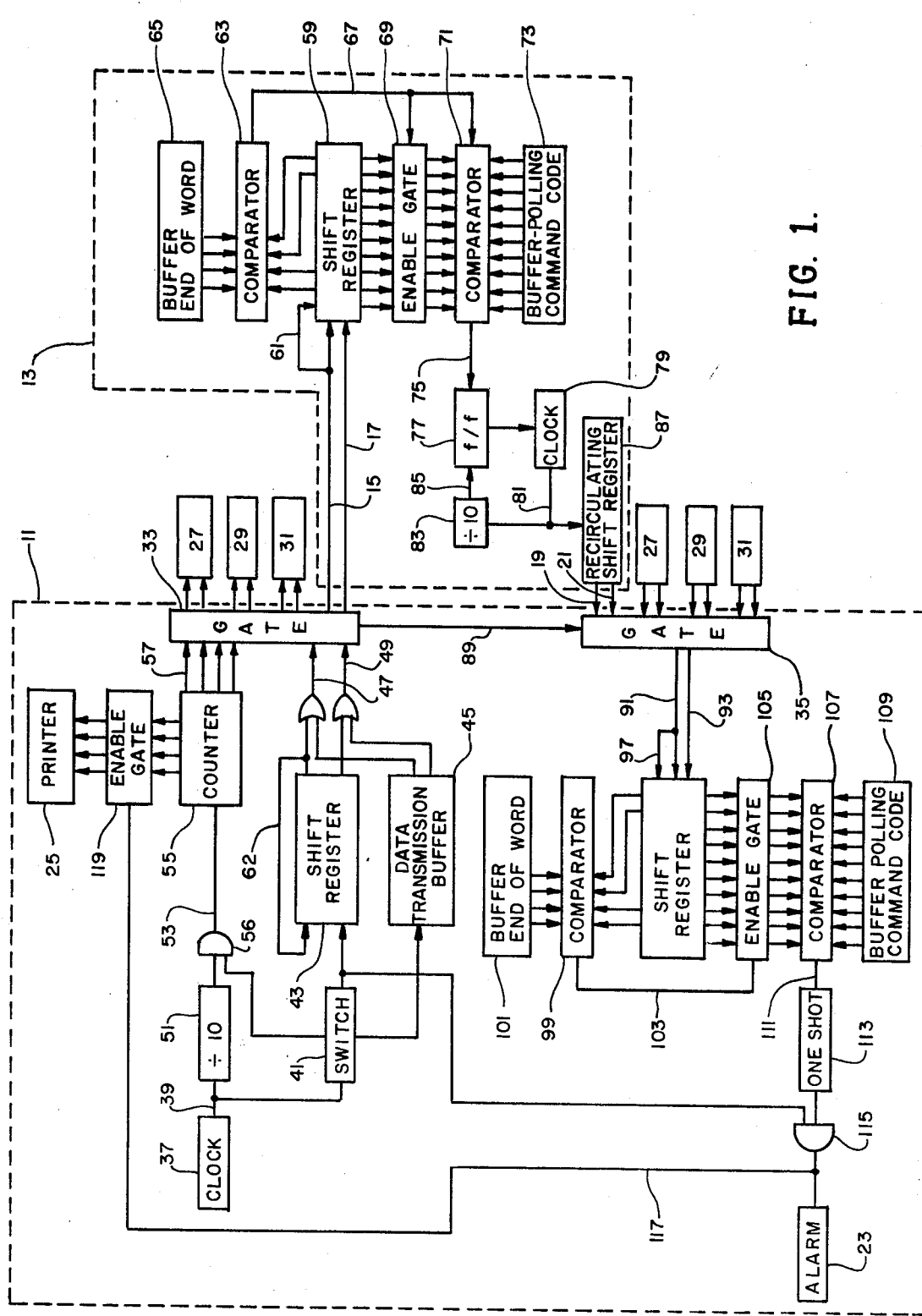

Referring to the FIGURE, a central data processing unit 11 is shown connected to a particular remote terminal 13 by a pair of polling lines 15,17 and a pair of data lines 19 and 21. It will be understood that the lines 15,17 are a line pair, the line 17 providing a return for the line 15. Similarly, the line 21 provides a return for the line 19. Polling and data signals which initiate at the central processor 11 are communicated to the remote terminal 13 on the line pair 15,17. Similarly, data signals produced at the remote terminal 13 are communicated to the central processor 11 on the line pair 19,21. The purpose of the present invention is to assure that, if any of the lines 15,17,19,21 are cut or otherwise open circuited, or if either pair of these lines is shorted together, a signal will be produced at the central processor 11 indicating that transmission line failure has occurred. Such failure can, of course, be caused by numerous line faults in addition to the situation where an unauthorized person is attempting to gain access by disturbing the communication lines. In response to such line failure, the central processor 11 energizes an alarm 23 to notify an operator of the line failure. At the same time, a signal can be produced which automatically operates a printer 25 to print the number of the terminal at which line failure has occurred, so that the central processor operator can investigate to determine the cause of the failure.

While the above description, as well as that which follows, explains the operation of the central processor 11 and a particular remote unit 13, it will be understood that the remote unit 13 is but one of plural remotes. In the diagram of FIG. 1, it is assumed that three additional remotes 27,29,31 are also a part of the security system. The FIGURE shows the units 27,29,31 as well as the remote unit 13, connected to a gate 33 for receipt of polling signals. The FIGURE also shows each of the units 27,29,31, and 13 connected to a second gate 35 for the transmission of signals from these remote units to the central processor 11. Thus, although the units 27–31 are shown twice in the drawing of FIG. 1, it will be understood that each of these units is a single remote station which communicates with each of the gates 33 and 35, as does the remote unit 13.

Since each of the units 27–31 is identical to the remote unit 13, only the remote unit 13 will be explained. It must also be understood that the central processor 11 and the remote units 13, 27–31, include monitoring and data capabilities beyond the line monitoring function which is described in this application, and thus the portion of the remote unit 13 and the central processor 11, which are described in detail in the following specification, are only a part of a larger security system. Nevertheless, the parts which are described are those which are used in monitoring line security for the overall system.

The overall system typically relies upon the sensing of encoded data on a card, badge or like object to gain access. Typically, the card or badge is inserted in a slot of a reader which reads and decodes the encoded data of the card. Advantageously, the data is encoded as a plurality of magnetically polarized spots in a strip of magnetic material. Such encoded data normally includes an identification number or numbers identifying the card holder, the number encoded by the card being compared with a number or numbers stored in the central computer terminal to ascertain whether the individual inserting the card is entitled to access to a building, room, parking lot and the like.

In one prior art embodiment, the magnetically polarized spots are used to directly actuate a read relay or other moving switch mechanism located within the reader. The state of the art system is exemplified by U.S. Pat. No. 3,686,479 entitled Static Reader System for Magnetic Cards assigned to A-T-O Inc., assignee of the present invention, employing electromagnetic, solid state sensors disclosed and claimed in U.S. Pat. No. 3,717,749, also assigned to A-T-O Inc. Such systems have been found to be very reliable and are in use as access control systems in a number of different industries, universities and government installations. The patents listed above are incorporated herein by reference.

The central processor 11 includes a clock 37 which periodically produces a signal on an output line 39 which is supplied directly to the input of a switch 41. The switch 41 is an electronic switch which has a single pole, double throw function and is used for supplying the clock signals on line 39 to either a recirculating shift register 43 or a data transmission buffer 45. During a normal polling sequence, the signals from the clock 37 are used for recirculating data in the shift register 43, and this data is, in turn, applied on lines 47 and 49 to the gate 33. Alternatively, when a specific instruction other than a polling command is to be transmitted to a particular remote unit, this instruction word is placed in the data transmission buffer by other units (not shown) in the central processor 11 and signals from the clock 37 are used to shift this data serially from the buffer 45 to the gate 33.

Signals from the clock 37 are also applied to a divide-by-10 divider network 51 which provides a signal at one-tenth the frequency of the clock 37 on a line 53, which signal is counted by a counter 55. The counter 55 is intended to count the total number of remote units 13,27–31 and to then reset to zero for a repeated count. Thus, the output of the counter 55 on lines 57 is used as a control for the gate 33 and selects a particular remote unit 13,27–31, for communication with the lines 47,49. Thus, for a particular output of the counter 55 on lines 57, a particular one of the remote units 13,27,29,31 will be connected by the gate 33 to the lines 47,49 for receipt of a polling signal. After every 10 clock pulses from the clock 37, the counter 55 is incremented and the gate 33 will connect the lines 47,49 to the next sequential remote unit 13,27-31. An AND gate 56 is connected to the switch 41, and is used to prohibit incrementing of the counter 55 when data from buffer 45, as opposed to polling signals from register 43, are being transmitted. The gate 33 may be no more than a matrix of AND gates controlled by the counter 55 in a common manner for interconnecting the necessary lines for this polling technique.

It will be assumed for the purpose of the remaining explanation, that the counter 55 has incremented to a count which controls the gate 33 for an interconnection between the lines 47,49 and lines 15,17 to the remote unit 13. It will also be assumed that no particular data instruction is being sent to the remote unit 13 so that the central processor 11 has controlled the switch 41 to conduct the pulses from the clock 37 to the recirculating shift register 43.

The shift register 43 stores the polling inquiry word which is sent to each of the remote units 13,27-31 in sequence. With a connection through gate 33 to the remote unit 13, the next 10 clock pulses from the clock 37 will circulate 10 bits within the shift register 43, and each of these bits, in turn, will be transmitted on the lines 15,17 to a shift register 59 in the remote unit 13. The shift register 59 is self-clocking in common fashion by means of a clocking signal 61 derived from the input line 15. Thus, data shifted onto the data buses 47,49 from the shift register 43 will automatically be shifted into the shift register 59 in the remote unit 13.

The standard polling command stored in the shift register 43 in the preferred embodiment includes an 8-bit word preceded and followed by a start and stop bit, respectively. Ten clock signals thus shift this word from the register 43 and recirculate the word by means of line 62 back into the input of the shift register 43 for transmission to the next sequential remote unit. During receipt of the 10-bit polling word on lines 15 and 17, the first two bits and last two bits of data in the shift register 59 are continuously compared by means of a comparator 63, with a 4-bit data word stored in a buffer 65 to determine when the complete polling word is present in the shift register 59. Thus, when the first two bits and last two bits in the shift register 59 match those of a proper polling or data word, the comparator 63 sends an enable signal on a line 67 to enable a gate 69 and a comparator 71.

The gate 69 shifts the data word in the shift register 59, in parallel, to the comparator 71. The comparator 71 also receives, from permanent storage in a buffer 73, the proper polling command code. If the data word received by the shift register 59 on lines 15 and 17 is identical to the word stored in the polling command code buffer 73, an output signal will be produced by the comparator 71 on a line 75, which signal will set a flip-flop 77. The flip-flop 77, in turn, enables a clock 79 having an output pulse rate which is identical to that of the clock 37. The clock 79 produces a series of output clock signals on line 81 which are divided by 10 in a divider circuit 83 to provide a reset signal on line 85 for the flip-flop 77. Once reset, the flip-flop 77 will disable the clock 79. The ten output clock signals produced by the clock 79 after setting of the flip-flop 77 (and before this flip-flop is reset) are used for driving a recirculating shift register 87 which stores a coded or calculated response to the polling command word. The shift register 87 shifts this proper response word, including a start and stop bit and 8 code bits, onto the data lines 19,21 to the gate 35 of the central processor 11.

As shown by the control line 89, the gate 35 is controlled by the counter 55 to communicate with the same remote unit as the gate 33, and thus, in the sequence being described, the gate 35 interconnects the lines 19 and 21 from the shift register 87 to a pair of lines 91 and 93 in the central processor 11. The lines 91,93 communicate the polling response word from the shift register 87 to a self-clocking shift register 95, which is clocked by the signal on line 91 through a connection 97 in typical fashion.

Operation of the shift register 95 is thus equivalent to operation of the shift register 59. In addition, the operation of a comparator circuit 99 and an end-of-word buffer 101 are equivalent to that described for the comparator 63 and end-of-word buffer 65, in the remote unit 13. These units thus provide an enable signal on a line 103 which enables an enable gate 105 to shift the word received by the shift register 95, in parallel, to a comparator 107. The comparator 107 is connected, in addition, to a buffer 109 which stores the proper polling response from the remote unit 13. If the response produced by the shift register 87 and communicated to the shift register 95 compares identically with the word in the buffer 109, an output will be produced from the comparator 107 on line 111 to set a monostable multivibrator, or one shot, 113. It should be noted that this one shot 113 is, in turn, connected to the alarm 23 through an AND gate 115. The remaining input to the AND gate 115 is connected to the output of the switch 41. If the switch 41 is in the polling position, as described earlier, so that specific data commands are not being sent from the central processor 11 to the remote units, and if the one shot 113 times out without being reset by a new signal on line 111, the alarm 23 will be sounded, notifying the equipment operator that no response has been received from the polling command sent to a remote unit. At the same time, the signal from the AND gate 115 is communicated on line 117 to an enable gate 119 which interconnects the number in the counter 55 to the printer 25 to print out (for use by the operator) the number of the remote unit which has failed to respond to a polling inquiry.

It should be noted that the monostable multivibrator 113 is set for a time which is longer than the sum of 10 clock pulses from the clock 37 and 10 clock pulses from the clock 79. That is, the time required for transmission of data from the central processor 11 to the polled remote 13 and a return of a calculated response from the register 87 of the remote 13 to the register 95. If a longer time period than is required for this dual transmission transpires, without the receipt of a proper response to polling, the one shot 113 will time out, setting the alarm 23 and printer 25. If, on the other hand, a timely appropriate response is received, the one shot 113 will be reset by the polling response, so that another timing sequence is initiated to time the response of the next successive remote unit to be polled.

From the preceding description, it can be seen that the remote unit 13 provides a specific coded response from the recirculating shift register 87 to a polling inquiry, even when data is not to be transmitted by the remote unit. If data is to be transmitted by the remote unit indicating, for example, a request for access through a particular remote location, other buffers will be connected to the lines 19 and 21 for communicating this particular data to the central processor. Each polling inquiry receives either a polling response from the register 87 or a particular data response. If a data response is received, this will activate the switch 41 so that the alarm 23 will not sound. If, on the other hand, a proper polling response is received, the one shot 113 will be reset to prohibit sounding of the alarm.

The present invention thus provides line security and will, through the use of a calculated or stored response from the register 87, notify an operator at the central processor 11 of a failure of either the polling lines 15,17 or data lines 19,21 in either a short circuit or open circuit mode, all of which can be done while, at the same time, utilizing a transmission mode in which the non-transmission condition is an open circuit.

This latter advantage is provided by making the output of the gates 33 and 35 an open circuit in the situation where a particular remote unit is not being polled by the central processor 11, and utilizing a data code for transmission from the shift registers 43 and 87 which has no current flowing for a teletype mark condition. That is, an inverse teletype code for transmission.

What is claimed is:

1. A system for monitoring communication line integrity in a remote data system, comprising:
    a central data processing terminal;
    plural remote terminals responsive to said central terminal;
    means in said central terminal for repeatedly issuing a polling request to each of said plural remote terminals;
    means for generating a coded data polling response in said remote terminal independently of the content of said polling request;
    means in said plural remote terminals for assuring the issuance of a response to each of said repeated polling requests whether or not data is to be transmitted from said remote terminals, said assuring means for responding to each said repeated polling request by transmitting to said central terminal said coded data polling response even though no other data is to be transmitted from said remote terminals; and
    means in said central terminal for monitoring said coded data polling responses from said plural remote terminals.

2. A system for monitoring communication line integrity as defined in claim 1 wherein said means for generating a coded data polling response comprises a register storing a coded data word and means for outputting the contents of said register.

3. A system for monitoring communication line integrity as defined in claim 2 wherein said means in said central terminal for monitoring said coded data polling responses compares said predetermined data word with a stored predetermined data word at said central terminal.

4. A system for monitoring communication line integrity as defined in claim 1 additionally comprising:
    alarm means at said central terminal responsive to said monitoring means and activated in the absence of said coded data polling responses from said plural remote terminal.

5. A system for monitoring communication line integrity as defined in claim 1 additionally comprising:
    means at said central terminal responsive to said means for monitoring for recording a failure of receipt of said coded data polling responses from one of said plural remote terminals.

6. A system for monitoring communication line integrity as defined in claim 1 additionally comprising:
    means at said central terminal for activating an alarm if one of said plural remote terminals does not respond to said repeated polling means within a predetermined time period.

7. A system for monitoring communication line integrity as defined in claim 1 wherein said central data processing terminal provides an open circuit transmission to said remote terminals between successive polling signals.

8. A system for monitoring communication line integrity as defined in claim 7 wherein said central data processing terminal provides a mark signal which is an open circuit.

9. A circuit for monitoring the integrity of communication lines in a remote data system, comprising:
    plural remote terminals mounted at remote locations;
    a central processing unit connected to each of said remote terminals, said central processing unit comprising:
        means for repeatedly transmitting a polling signal to each of said plural remote terminals whether or not data is to be transmitted;
        means for sensing repeated polling responses from each of said plural remote terminals replying to said repeated polling signal;
        a stored data word independent of the contents of said polling signal; and
        means for comparing said sensed responses to said stored data word; and
    means for producing an indication of line failure whenever one of said remote units does not respond to said polling signal with a polling response which matches said predetermined data word within a predetermined time period.

10. A circuit for monitoring the integrity of communication lines as defined in claim 9 wherein said plural remote terminals provide a predetermined coded signal in response to receipt of a polling signal when said remote terminals have no other data for transmission to said central processing unit.

11. A circuit for monitoring the integrity of communication lines as defined in claim 9 additionally comprising:
    means at said central processing unit for recording which of said plural remote terminals fails to respond to said polling signal with a coded response within a predetermined time period.

12. A circuit for monitoring the integrity of communication lines as defined in claim 9 additionally comprising:
    means at each of said plural remote terminals for storing in a buffer a coded response to said polling signal.

13. A method of monitoring line integrity in a remote data system including a central data processing unit and plural remote stations, said method comprising:
    repeatedly transmitting polling signals to each of said plural remote stations from said central data processing unit whether or not said plural remote stations have data to transmit;
    assuring the issuance of a response to each of said repeated polling signals whether or not data is to be transmitted from said remote stations by producing in each of said remote stations, in response to said polling signal, a coded response signal, independently of the content of said polling signal even in the absence of data to be transmitted from said remote terminals;

transmitting said coded response signals from said remote stations to said central data processing unit; and monitoring for receipt of said coded response signals at said central data processing unit.

14. A method of monitoring line integrity as defined in claim 13 additionally comprising:

initiating an alarm in response to failure during said monitoring step to receive said coded response signals within a predetermined amount of time.

15. A method of monitoring line integrity as defined in claim 13 additionally comprising:

recording at said central processing unit in response to said monitoring step which of said plural remote stations has failed to transmit said coded response to said central data processing unit.

16. A method of monitoring line integrity as defined in claim 13 additionally comprising:

transmitting from said central data processing unit between said polling signals an open circuit configuration to said remote terminals.

17. A method of monitoring line integrity as defined in claim 13 wherein said monitoring step comprises:

comparing the time required for receipt of said coded response signals with a predetermined time period.

* * * * *